June 19, 1928.
F. L. MINNICK
VEHICLE WHEEL
Original Filed July 3, 1924
1,673,840
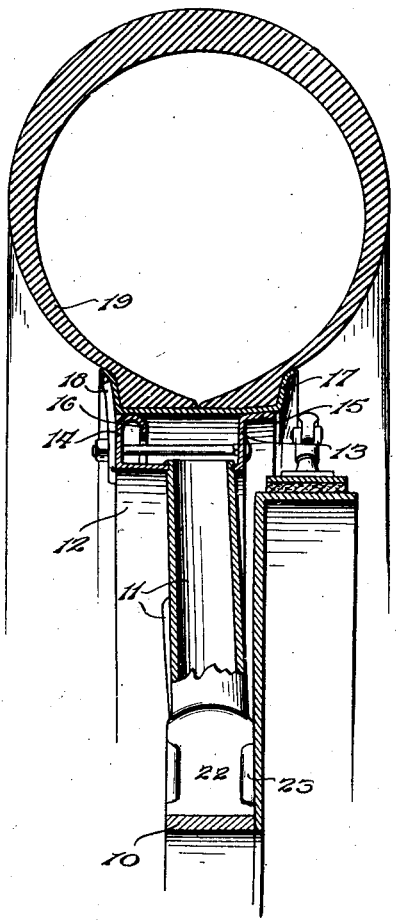
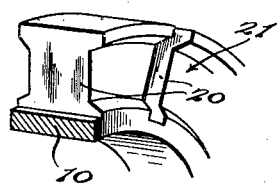
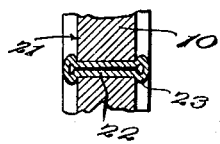
Inventor
F. L. Minnick
By Lacey & Lacey, Attorneys Patented June 19, 1928.

1,673,840

UNITED STATES PATENT OFFICE.

FREDERICK L. MINNICK, OF SEATTLE, WASHINGTON, ASSIGNOR, BY DIRECT AND MESNE ASSIGNMENTS, TO DEAN-MINNICK STEEL WHEEL COMPANY, OF SEATTLE, WASHINGTON, A CORPORATION.

VEHICLE WHEEL.

Original application filed July 3, 1924, Serial No. 724,134. Divided and this application filed October 23, 1924. Serial No. 745,447.

This invention relates to an improved metal vehicle wheel, being a division of Patent No. 1,549,370, for vehicle wheel, issued to me August 11, 1925.

The invention seeks to provide an improved and novel connection between the wheel spokes and the hub such as will facilitate the manufacture of an all-metal wheel while, at the same time, providing a secure and rigid construction.

Other and incidental objects will appear hereinafter.

In the accompanying drawings:

Figure 1 is a fragmentary sectional view of a wheel embodying the present improvements, Figure 2 is a fragmentary perspective view of the wheel hub, and Figure 3 is a detail sectional view on the line 3—3 of Figure 1, looking in the direction indicated by the arrows.

The wheel of the present invention is constructed entirely of metal and embodies a hub 10 from which radiate a plurality of tubular spokes 11. Supported by the spokes in concentric relation to the hub is a channel-shaped felly having a bottom wall 12, one side wall 13, and an opposite side wall 14. The bottom wall 12 of the felly is apertured to receive the outer ends of the spokes which, as shown in Figure 1, are turned down against the adjacent face of said wall for rigidly connecting the felly with the spokes. The side wall 13 of the felly is provided with a lateral inclined flange 15 while the side wall 14 is formed with an inturned flange 16 and slidable across the latter flange to coact with the flange 15, is a rim 17 secured by rim clamps 18. A conventional tire 19 has been illustrated in connection with the rim.

Coming now more particularly to the subject of the present improvements, the hub 10 is, as particularly shown in Figure 2, provided with a plurality of radial slots 20 and formed in the opposite side faces of the hub are annular channels 21. The spokes 11 are rolled or otherwise shaped at their inner ends to form flattened terminals 22 and, as shown in Figure 3, these terminals are inserted in the slots 20 of the hub and are upset at their side edges to form locking ribs 23 lying within the channels 21. Initially, the terminals of the spokes are of a width to project at the side faces of the hub so that the side edges of the terminals may thus be readily hammered for compressing the terminals within the slots 20 as well as producing the locking ribs 23. In thus upsetting the projecting margins of the spoke terminals 22 in the channels 21 of the hub, said terminals are caused to bind in the slots 20 for tightly securing the spokes against radial movement while the ribs 23 will, of course, rigidly lock the spokes against lateral displacement. A secure and rigid connection between the spokes and the hub is thus provided while, at the same time, the construction is such as to facilitate the manufacture of the wheel.

Having thus described the invention, what I claim is:

The combination with a hub having radial slots and annular channels in opposite sides forming inner and outer stop shoulders, of tubular spokes having their inner ends flattened and fitted within the radial slots of the hub, and having opposite side portions upset to lie within the channels and overlap the walls of the radial slots and abut the inner and outer stop shoulders, whereby to prevent any longitudinal and lateral movement of the spokes in their respective radial slots.

In testimony whereof I affix my signature.

FREDERICK L. MINNICK. [L. S.]